(12) United States Patent
Heller

(10) Patent No.: US 8,727,661 B2
(45) Date of Patent: May 20, 2014

(54) VARIABLE SPEED BOAT LIFT MOTOR CONTROLLER

(75) Inventor: Lonnie D. Heller, Wilmington, NC (US)

(73) Assignee: Portco Automation, LLC, Winston-Salem, NC (US)

( * ) Notice: Subject to any disclaimer, the term of this patent is extended or adjusted under 35 U.S.C. 154(b) by 298 days.

(21) Appl. No.: 13/086,323

(22) Filed: Apr. 13, 2011

(65) Prior Publication Data

US 2012/0263533 A1   Oct. 18, 2012

(51) Int. Cl.
*B63C 3/06* (2006.01)

(52) U.S. Cl.
USPC ............................ 405/3; 405/1; 114/44

(58) Field of Classification Search
USPC .................. 405/1, 3; 114/44, 51; 414/628
See application file for complete search history.

(56) References Cited

U.S. PATENT DOCUMENTS

| | | |
|---|---|---|
| 3,967,701 A | 7/1976 | Hegenbart |
| 4,430,041 A | 2/1984 | Hemingway et al. |
| 5,284,325 A | 2/1994 | Sasaki et al. |
| 5,593,247 A | 1/1997 | Endres et al. |
| 5,772,360 A * | 6/1998 | Wood, II ............... 405/3 |
| 6,174,106 B1 * | 1/2001 | Bishop et al. ............... 405/3 |
| 6,543,375 B1 | 4/2003 | Sargent et al. |
| 6,767,004 B1 | 7/2004 | Davis |
| 6,956,339 B1 | 10/2005 | Kureck et al. |
| 7,090,431 B2 * | 8/2006 | Cosgrove et al. .............. 405/3 |
| 7,534,069 B1 | 5/2009 | Stanley |
| 7,766,577 B2 | 8/2010 | Attwater et al. |
| 2001/0006590 A1 * | 7/2001 | Bishop et al. ............... 405/3 |
| 2006/0263148 A1 | 11/2006 | Way |
| 2008/0306642 A1 | 12/2008 | Figura et al. |
| 2009/0185861 A1 * | 7/2009 | Stanley ............... 405/3 |
| 2009/0220300 A1 * | 9/2009 | Stanley ............... 405/3 |

* cited by examiner

*Primary Examiner* — Benjamin Fiorello

(74) *Attorney, Agent, or Firm* — Spilman Thomas & Battle, PLLC

(57) ABSTRACT

Systems, apparatuses, and methods for controlling a variable speed boat lift motor. The systems, apparatuses, and methods include a user interface for connection to a variable speed boat lift drive. The user interface transmits a signal to a variable speed boat lift drive that causes the variable speed boat lift drive to rise at a first speed set by a user through the user interface and lower at a second speed set by a user through the user interface.

10 Claims, 7 Drawing Sheets

VARIABLE SPEED BOAT LIFT MOTOR CONTROLLER

CROSS-REFERENCE TO RELATED APPLICATIONS

Not applicable.

STATEMENT REGARDING FEDERALLY SPONSORED RESEARCH

Not applicable.

FIELD OF THE INVENTION

This invention relates to boat lifts and, more particularly, to boat lift motor controllers.

BACKGROUND OF THE INVENTION

Boat lifts are used to raise boats and other personal watercraft out of water and lower boats and other personal watercraft into the water. Boat lift systems can use a variety of means to power the lifting function including electric motors, hydraulic and pneumatic systems and manual cranks. Boat lift systems using electric motors are often powered by electric power across the line. In such a system, the motors operate at a fixed voltage and frequency. This results in the motors operating at a fixed speed and torque. Boat lift motor systems lacking in the ability to vary the speed and torque of the motors are also lacking with regard to position control in that the boat lift may not be able to provide beneficial motor control, such as, for example, independently variable lifting speeds for a range of boats and other watercraft. This provides disadvantages as to flexibility in using the boat lift for boats and other watercraft of varying size.

For boat lifts that employ multiple motors, synchronization of the motors can pose difficulties, for example, due to the sensitivity of the motors to slight fluctuation in the electric power. Because each individual motor is usually attached to a separate part of the boat lift cradle device, the lack of synchronization in the motors can result in an uneven raising or lowering of a boat. If the speed between the motors is too great, the boat lift cradle will become too far out of level to continue to move safely, thus necessitating correction.

Existing methods of leveling a boat lift are to manually stop the motors and for the user to manually run one motor at a time to adjust the boat lift cradle to return to a level position. These systems lack the ability automatically level the boat lift without stopping the motors and thus add a significant amount to time in raising or lowering the boat lift. Such starting and stopping can furthermore reduce the life of a motor.

SUMMARY OF THE INVENTION

In one embodiment, the present disclosure relates to a boat lift motor controller. In that embodiment, the boat lift motor controller includes a user interface for connection to a variable speed boat lift drive. The user interface transmits a signal to a variable speed boat lift drive that causes the variable speed boat lift drive to rise at a first speed set by a user through the user interface and lower at a second speed set by a user through the user interface.

In another embodiment, the present disclosure relates to a method of controlling a boat lift. In that method, a first signal indicative of a rising speed to a variable speed boat lift drive is transmitted and a second signal indicative of a lowering speed to the variable speed boat lift drive is transmitted.

In yet another embodiment, the present disclosure relates to a boat lift motor controller that includes a user interface for connection to a variable speed boat lift drive. The user interface further includes a user control, an output board, and a processor, wherein the user control receives input from a user, the output board transmits a signal, and the processor is coupled to the user control and the output board. The processor further executes instructions that cause the processor to receive a first rising speed input from the user control indicative of a speed at which the boat lift motor is to rise, receive a second rising acceleration input from the user control indicative of a rate of speed at which the boat lift motor is to accelerate to the rising speed, receive a third rising deceleration input from the user control indicative of a rate of speed at which the boat lift motor is to decelerate to the rising speed, receive a fourth lowering speed input from the user control indicative of a speed at which the boat lift motor is to lower, receive a fifth lowering acceleration input from the user control indicative of a rate of speed at which the boat lift motor is to accelerate to the lowering speed, receive a sixth lowering deceleration input from the user control indicative of a rate of speed at which the boat lift motor is to decelerate to the lowering speed, and transmit a speed signal to the boat lift motor through the output board.

Accordingly, the present invention provides solutions to the shortcomings of prior boat lift controllers, methods of controlling a boat lift, and systems for lifting and lowering boats. Those of ordinary skill in the construction and operation of boat lifts will readily appreciate that those details described above and other details, features, and advantages of the present invention will become further apparent in the following detailed description of the preferred embodiments of the invention.

BRIEF DESCRIPTION OF THE DRAWINGS

The accompanying drawings, wherein like reference numerals are employed to designate like components, are included to provide a further understanding of the pedestal support, and are incorporated in and constitute a part of this specification, and illustrate embodiments of the pedestal support that together with the description serve to explain the principles of the pedestal support.

Various other objects, features and advantages of the invention will be readily apparent according to the following description exemplified by the drawings, which are shown by way of example only, wherein.

DETAILED DESCRIPTION

Reference will now be made to embodiments of the boat lift motor controller, examples of which are illustrated in the accompanying drawings. Details, features, and advantages of boat lift motor controller will become further apparent in the following detailed description of embodiments thereof.

Any reference in the specification to "one embodiment," "a certain embodiment," or a similar reference to an embodiment is intended to indicate that a particular feature, structure, or characteristic described in connection with the embodiment is included in at least one embodiment of the invention. The appearances of such terms in various places in the specification are not necessarily all referring to the same embodiment. References to "or" are furthermore intended as inclusive so "or" may indicate one or the other ored terms or more than one ored term.

Figure 1:
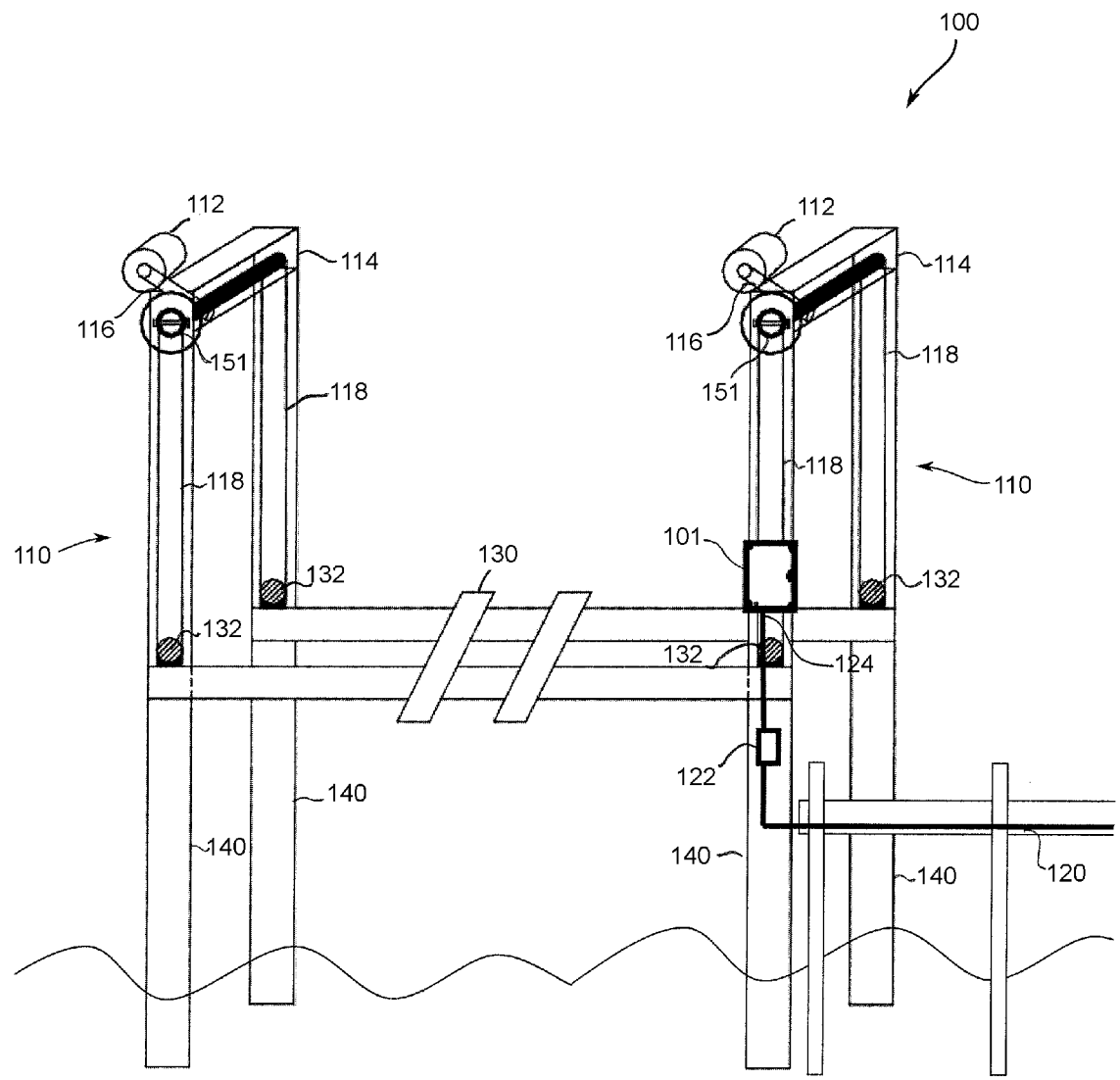
FIG. 1 illustrates an embodiment of a two motor boat lift system.

FIG. 1 is an illustration of one embodiment of a boat lift 100 using the boat lift motor controller 101 with a two motor lifting device 110. The boat lift motor controller 101 may be connected to an electric power source 120. In the embodiment in FIG. 1 the power source 120 passes through a ground fault circuit interrupting (GFCI) outlet 122 before entering the boat lift motor controller 101. The boat lift motor controller 101 is electrically coupled to the motors 112 of the two motor boat lifting device 110. The motors 112 may be connected to and drive cable winding devices 114 by a belt, chain or other mechanical linkage 116. The cable winding devices 114 may be attached to a boat lift cradle 130 which may support the load of the boat or personal watercraft (not shown) that is being lifted or lowered. The boat lift 100 may be supported on top of pilings 140 which have been driven into the ground under the water.

The electric power source 120 may enter the boat lift motor controller 101 through a watertight conduit 124. The boat lift motor controller 101 additionally may be watertight and any input and output electrical cables may also pass through watertight conduits. In lieu of an external, across the line, electric power source 120, the boat lift motor controller 101 may also be powered by an internal electric power source, such a battery (not shown).

Figure 2:
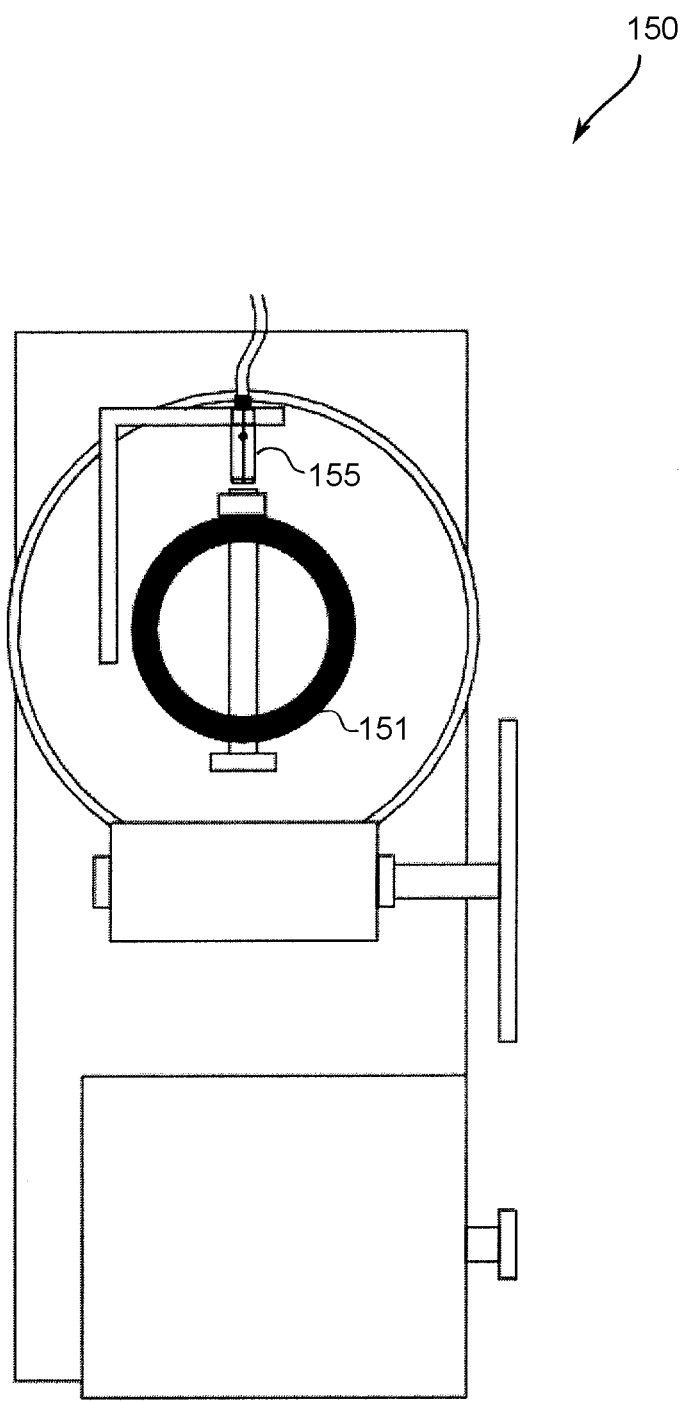
FIG. 2 illustrates a cross-sectional view of an embodiment of the cable winding device of FIG. 1.
Figure 3:
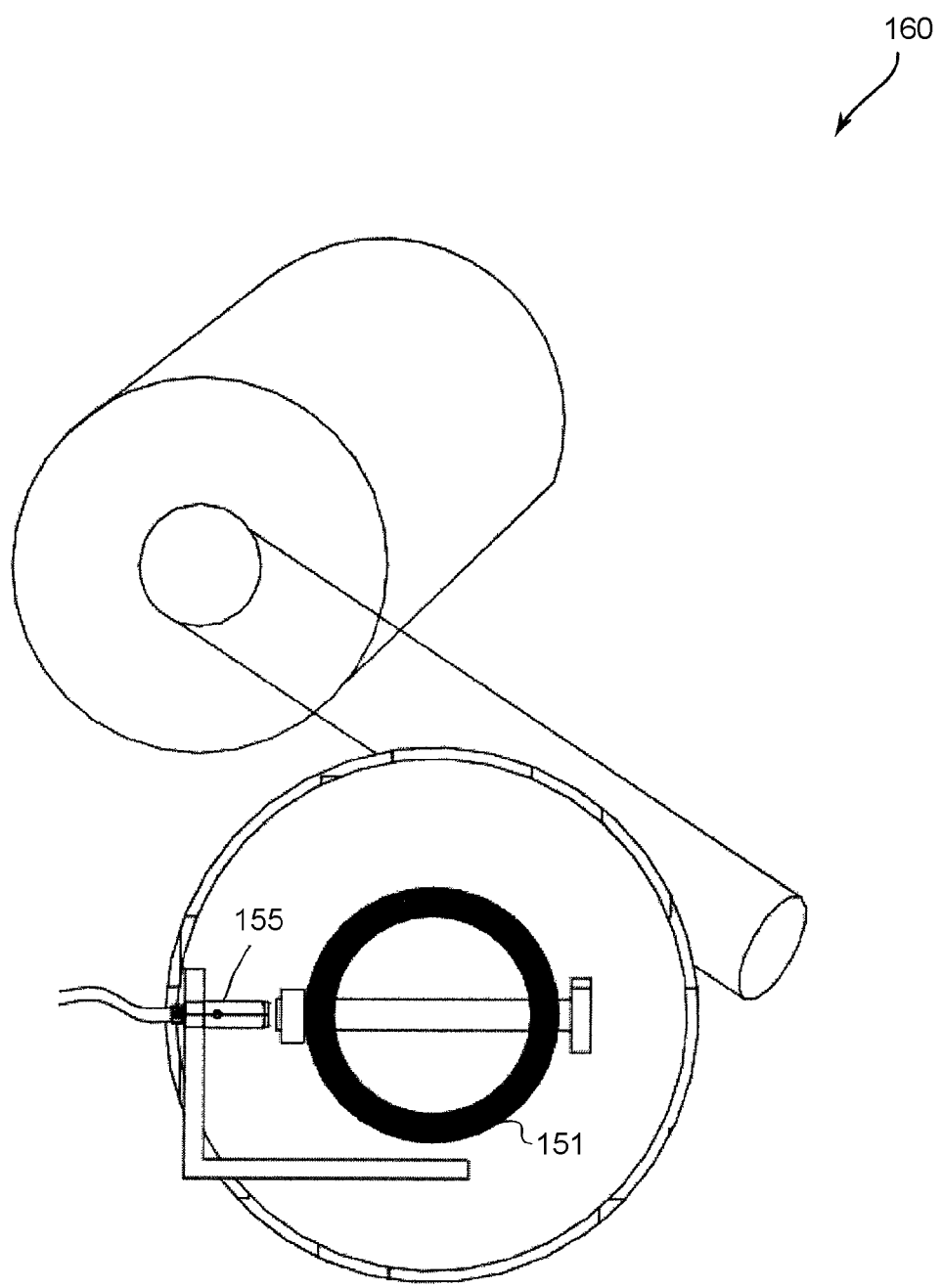
FIG. 3 illustrates a cross-sectional view of an alternative embodiment of the cable winding device of FIG. 1.

The mechanical linkage 116 between the motor and cable winding device may include an open gearbox flat plate drive 150, and a right angle enclosed gearbox 160. In FIG. 2 an open gearbox flat plate drive 150 is depicted. In FIG. 3 a right angle enclosed gearbox 160 is depicted. The open gearbox flat plate drive 150 may mechanically connect to one of the motors 112 and one of the cable winding devices 114 and act to transmit the drive power of the motor 112 to the cable winding device 114. Similarly, the right angle enclosed gearbox 160 acts to transmit the drive power of the motor 112 to the cable winding device 114 by mechanically connecting one of the motors 112 to one of the cable winding devices 114.

The boat lift 100 in FIG. 1 operates by raising and lowering the boat lift cradle 130. The cable winding device 114 may wind and unwind a cable 118 that is connected to the boat lift cradle 130 and the cable winding device 114. The cable 118 may be connected to the boat lift cradle through a pulley 132. Commands to raise or lower the boat lift cradle 130 may be sent from the boat lift motor controller 101 to the motors 112. When power is delivered to the motors 112, the motors 112 drive the cable winding device 114. When the motors 112 spin to wind the cable 118 the boat lift cradle 130 will move upward. When the motors 112 spin in the opposite direction, the cable 118 will unwind and the boat lift cradle 130 will move downward.

Figure 4:
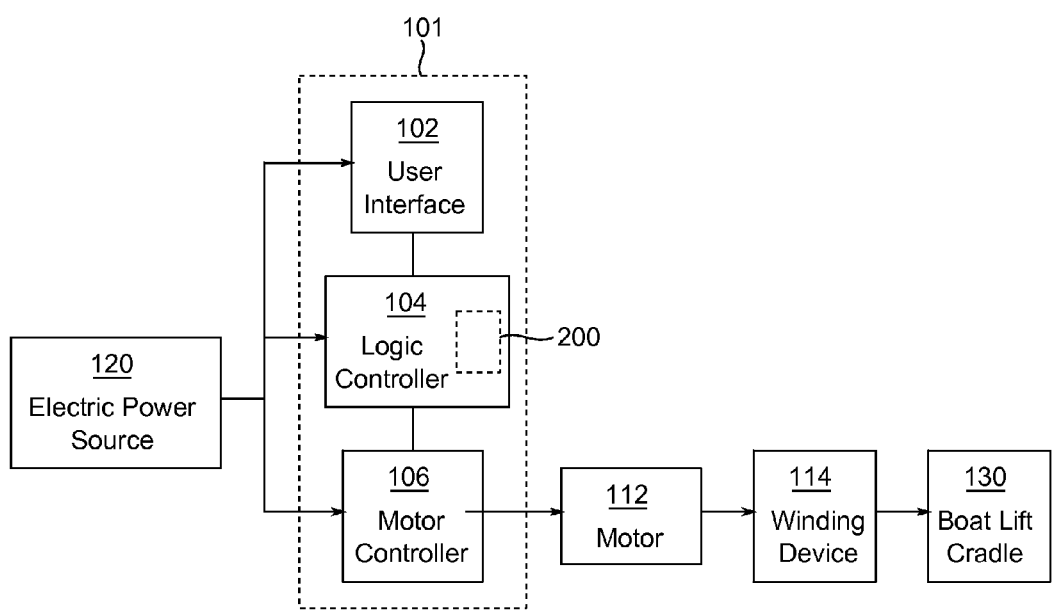
FIG. 4 illustrates a flow chart of the operation of an embodiment of a boat lift motor controller.
Figure 5:
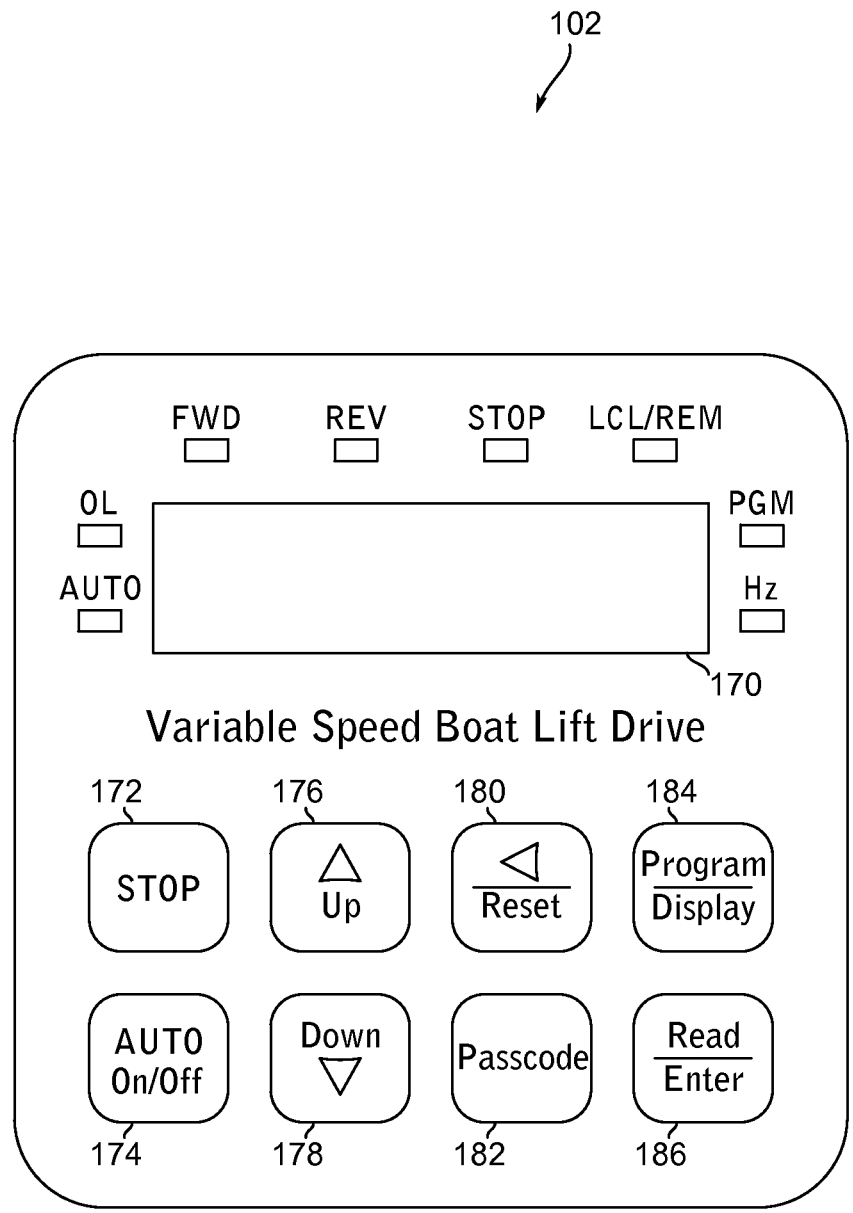
FIG. 5 illustrates an embodiment of a user interface device for use with the boat lift motor controller of FIG. 4.

FIG. 4 is a flow chart of the operations of the boat lift motor controller 101 in one embodiment. FIG. 4 illustrates the set up for a single motor boat lift system, however, it will be understood that additional motors can be added as well as additional motor controllers. The electric power source 120 may provide electric power to the boat lift motor controller 101. The boat lift motor controller 101 may contain a user interface device 102, a logic controller 104, and a motor controller 106. The user interface device 102 is coupled to the logic controller 104. The logic controller 104 is coupled to the motor controller 106. The logic controller 104 may be coupled to the user interface device 102 and motor controller 106 by way of an electric connection such as being wired together or connected on a circuit board. It is also possible for the logic controller 104 to be coupled to the user interface 102 and motor controller 106 wirelessly, using a transmitter and receiver. A transmitter and receiver connection may use a wide range of frequencies, for example, the transmitter may transmit IR signals or UHF signals to the receiver. It is understood that while the embodiment in FIG. 4 has the user interface device 102, the logic controller 104 and the motor controller 106 all connected to the same electric power source 120, each component of the boat lift motor controller 102 may be powered from independent electric power sources The user interface device 102 allows a person to control the operation of the boat lift cradle 130. One embodiment of the user interface device is depicted in FIG. 5. In the embodiment, the user interface device 102 contains a display 170, a stop button 172, an auto on/off button 174, an up button 176, a down button 178, a left arrow/reset button 180, a passcode button 182, a program/display button 184 and a read/enter button 186. In this embodiment, the stop button 172 will stop the motor 112 in any mode. The auto on/off button 174 will turn the boat lift motor control 101 on or off. Additionally the auto on/off button 174 may allow the user to change the function of the up button 176 and down button 178 to require the user to either hold the button for the function to run or to allow the user to press and release the button for the function to run. The up button 176 may allow the user to move the boat lift cradle 130 up. The up button 176 also may allow the user to increment the display digits when the boat lift motor controller is in program mode. The down button 178 may allow the user to move the boat lift cradle 130 down. The down button 178 also may allow the user to decrement the display digits when the boat lift motor controller is in program mode. The left arrow/reset 180 button allows the user to select the next digit to the left when the boat lift motor controller is in program mode. The left arrow/reset button 180 also allows the user to reset the boat lift motor controller 101 from a fault condition in this embodiment, though that and other functions may operate in alternate ways in various other embodiments. The passcode button 182 allows the user to enter or change the user passcode when the boat lift motor controller 101 is in stop mode. The program/display button 184 allows the user to cycle through the display modes. Display modes may include displays on the display 170 of motor frequency, motor current, motor voltage, and bus voltage. Program mode can provide information to assist a user in troubleshooting the user interface or connected system. The read/enter button 186 allows the user to enter a passcode after pressing the passcode button 182. The read/enter button 186 also allows the user to display or enter a boat lift operational parameter value. The read/enter button additionally may be used to initiate user passcode lockout mode by pressing and holding the button 186 for a preset time interval.

The user interface may also include a remote control device. The remote control device may be connected to the logic controller through the use of a transmitter and receiver system. The remote control device will allow for the user to operate the controls of the boat lift motor controller 101 from a preset distance away from the location of the boat lift motor controller 101.

The logic controller 104 receives input signals and outputs signals to control the boat lift motors. For example, the logic controller 104 may receive inputs from the user interface 102 and sensors, such as boat lift level sensors (illustrated in FIG. 2, 3). The logic controller 104 outputs signals or data, for example, to the boat lift motor controller 106 in accordance with programming or instructions being executed by the logic controller 104.

Figure 6:
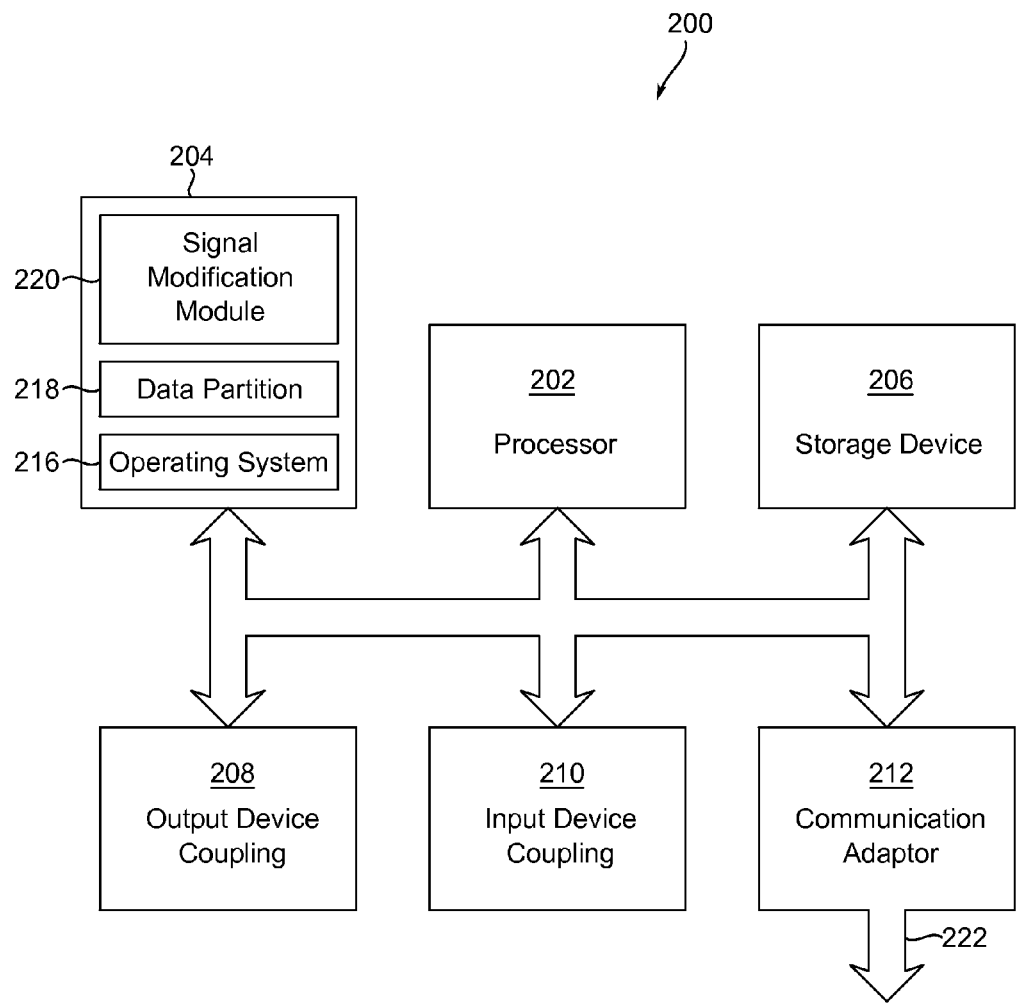
FIG. 6 illustrates an embodiment of a control circuit that may be used in connection with a logic controller in the boat lift motor controller of FIG. 4.

The logic controller 104 may contain control circuitry such as the control circuitry 200 illustrated in FIG. 6. The control circuitry 200 may include a processor 202, memory 204, a storage device 206, a coupling for an input device 208, a coupling for an output device 210 and a communication adaptor 212. The processor 202, memory 204, storage device 206, coupling for an input device 208, coupling for an output device 210 and the communication adaptor 212 are interconnected through the use of one or more communication busses 214. It should be understood that control circuitry 200 may have fewer components or more components than shown in FIG. 6. For example, if it is not desired for the control circuitry 202 to communicate to other devices such as general purpose computers, then the communication adaptor 212 may be omitted.

The memory 204 may, for example, include random access memory (RAM), dynamic RAM, and/or read only memory (ROM) (e.g., programmable ROM, erasable programmable ROM, or electronically erasable programmable ROM) and may store computer program instructions and information. The memory 204 may furthermore be partitioned into sections including an operating system partition 216 where system operating instructions are stored, a data partition 218 in which data is stored, and a signal modification partition 220 in which signal modification operational instructions are stored. The signal modification partition 220 may include circuitry or code that receives a signal value from, for example, the user interface device 102 and calculates an appropriate output value to be made incident at the output 208. The signal modification partition 220 may store program instructions and allow execution by the processor 202 of those program instructions. The data partition 218 may furthermore store data such as, for example, operational parameters entered into the user interface device 102 by a user to be used during the execution of the program instructions.

The processor 202 may, for example, be an ARM® ARMS type processor or another processor manufactured by, for example Zilog®. The processor 202 may furthermore execute the program instructions and process the data stored in the memory 204. In one embodiment, the instructions are stored in memory 204 in a compressed and/or encrypted format. As used herein the phrase, "executed by a processor" is intended to encompass instructions stored in a compressed and/or encrypted format, as well as instructions that may be compiled or installed by an installer before being executed by the processor 202.

The storage device 206 may, for example, be non-volatile battery backed SRAM, a magnetic disk (e.g., portable storage device and hard drive), optical disk (e.g., CD-ROM) or any other device or signal that can store digital information. It will be recognized, however, that the control circuitry 200 does not necessarily need to have the storage device 206 to operate as control parameters and other data may be stored in memory 204, for example.

The communication adaptor 172 permits communication between the control circuitry 200 and other devices or nodes coupled to the communication adaptor 212 at the communication adaptor port 222. The communication adaptor 212 may be a network interface that transfers information from a node such as a general purpose computer to the control circuitry 200 or from the control circuitry 200 to a node. It will be recognized that the control circuitry 200 may alternately or in addition be coupled directly to one or more other devices through one or more input/output adaptors (not shown).

The input device coupling 210 and output device coupling 208 may couple one or more devices such as, for example, the user interface device 102.

The elements 204, 204, 206, 208, 210, and 212 related to the control circuitry 200 may communicate by way of one or more communication busses 214. Those busses 214 may include, for example, a system bus, a peripheral component interface bus, and an industry standard architecture bus.

Returning to FIG. 4, the motor controller 106 receives one or more signals from the logic controller 104. The motor controller 106 adjusts the electrical power coming from the electric power source 120 so as to provide the proper electric power to the motor 112 thereby driving the motor 112 at the speed and torque selected by the motor controller 106.

In one embodiment, the motor 112 may be a three phase AC motor that may run at 240 VAC and may be rated to 3.6 Amps. The corresponding motor controller 106 for the three-phase motor 112 is a variable frequency drive (VFD). The VFD converts the electric power from the electric power source 120, which in this embodiment is 240 volts, 60 Hz, AC power and into a range of voltages and frequencies. Having the ability to vary the frequency or voltage being supplied to a three phase AC motor 112 may allow the torque and RPM of the motor to also be made variable. In such an embodiment, the user is given the ability adjust the speed and torque of the motor 112 through the user interface 102. In such an embodiment, when a user inputs a command into the user interface 102 to cause the boat lift cradle 130 to rise, a signal is sent from the user interface 102 to the logic controller 104 and from the logic controller 104 to one or more motor controllers 106 and from the motor controllers to one or motors 112. The logic controller 104 interprets the command being sent from the user interface 102, manipulates that command as necessary to effectuate the desired control, and sends a corresponding signal to the VFD 106. The VFD 106 then adjusts the electric power's voltage and frequency according to the command received from the logic controller 104. The adjusted electric power then drives the three phase motor 112 at the speed and torque requested by the user.

In an alternative embodiment, the motor 112 is a brushless DC motor. The corresponding motor controller 106 for the brushless DC motor 112 is an electronically commutated motor controller (ECMC) 106. The ECMC 106 will convert the electric power from the electric power source 120, which in this embodiment is 240 volts 60 Hz AC, into DC current that is commutated such that the brushless DC motor 112 can drive the winding device 114. The ECMC 112 may also be used to vary the speed of the brushless DC motor 112 by the frequency at which the DC current is commutated. As a result, as with the VFD motor controller 112, when the ECMC 112 is paired with a logic controller 104 and user input device 102, a boat lift user will have the ability to adjust the speed at which the motors 112 wind or unwind the cable winding device 114 and as a result, drive the boat lift cradle 130 up or down. It should be noted that any desired type of motor capable of variable speed may be controlled by the motor controller 106.

In one embodiment, the boat lift 100 includes sensors 155 that may monitor the position of the boat lift cradle 130. The sensors 155 may be located on the cable winding device 114 such that they count the revolutions of the individual pipe drive shafts 151. As the motor 112 drives the cable winding device 114 and the pipe drive shaft 151 rotates, the sensor 155 will detect each rotation and send a signal, which corresponds to the height of the boat lift cradle 130, to the logic controller 104. The sensors 155 can be a variety of devices, including inductive proximity switches and photoelectric sensors.

Through the use of the sensors 155, the boat lift motor controller 101 may also provide the user with additional position control of the boat lift cradle 130. For example, the boat lift motor controller 101 may permit the user to set upper and lower height limits through the program function 184 found on the user interface 102. Within the logic controller 102, a default value may be set for the upper height limit and another default value may be set for the lower height limit and a custom upper height limit or a custom lower height limit may be set by the user. In one embodiment, at least one of the default upper and lower height limits is an absolute limit such that the custom upper limit may be lower than the default upper height limit, but not higher than the default upper height limit, or the custom lower limit may be higher than the default lower height limit, but not lower than the default lower height limit.

In one embodiment, sensors communicating boat lift cradle 130 height limits by contact closure may be employed to indicate when boat lift cradle 130 travel should cease on either the upper end of the boat lift cradle 130 travel range or the lower end of the boat lift cradle 130 travel range. Those sensors may furthermore be programmable through the user interface 102 so that maximum and minimum heights for travel can be determined by the user.

Information from the one or more sensors 155 may be sent to the logic controller 104 via a wired or wireless electrical connection such as through the input device coupling 210. The logic controller 104 may then convert the sensor signal into a value related to the height of the boat lift cradle 130. In an embodiment, as the motor or motors 112 are running the logic controller 104 will compare the current lift height value with the preset (by default or user setting) values for upper and lower limits. If the measured lift height value reaches or exceeds one of the preset limits, the logic controller 104 will signal to the motor controller 106 to stop the motors 102. The logic controller 104 may signal to the motor controller 106 through the output device coupling 208. Additionally, the logic controller 104 may signal through the output device coupling 206 to the user interface 102 to indicate on the display 170 that a lift height limit has been reached.

Figure 7:
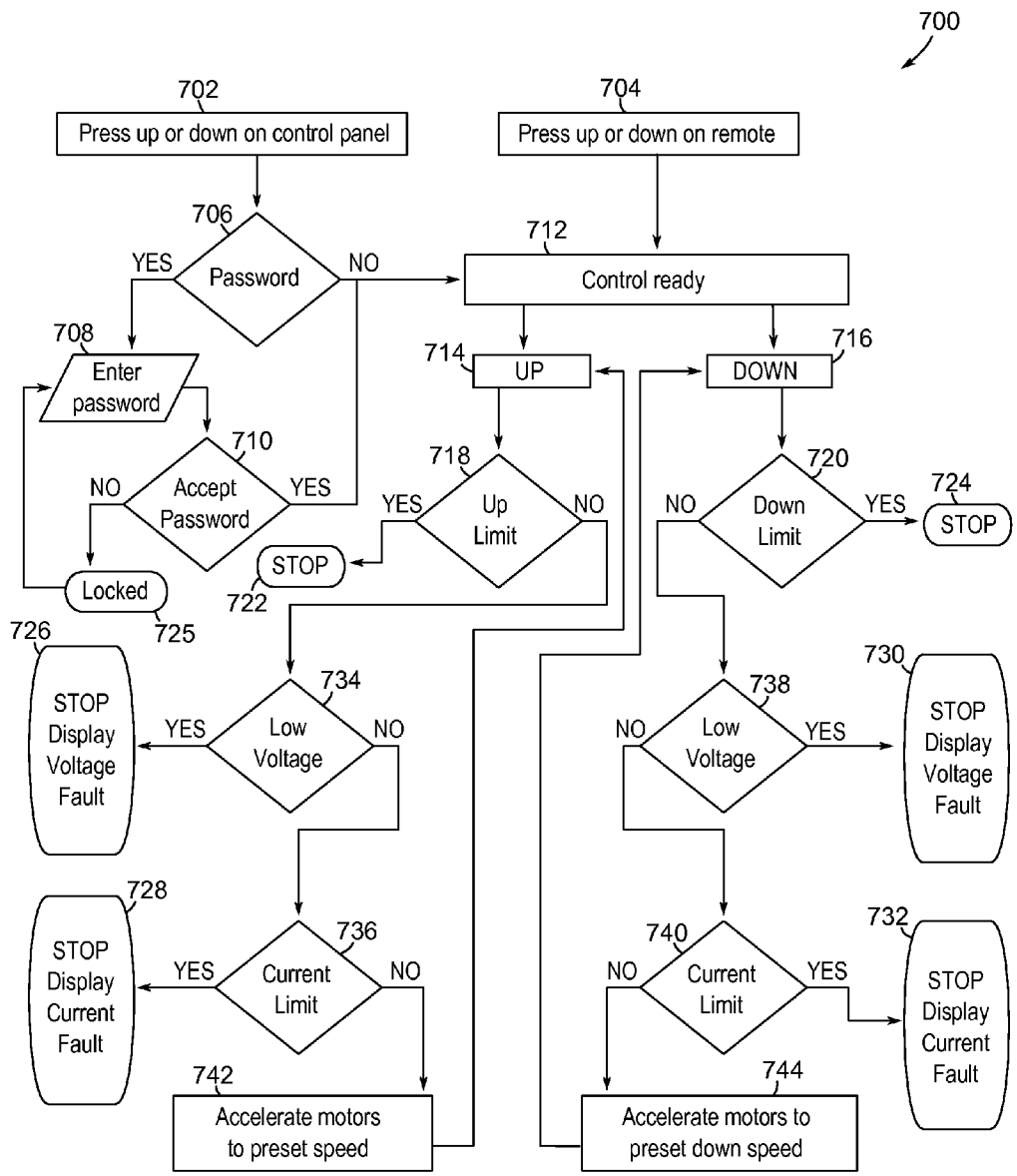
FIG. 7 illustrates a flow chart of the basic operation of an embodiment of a boat lift.

FIG. 7 is a flow chart of one embodiment of the path logic 700 of the logic controller 104. In the embodiment illustrated in FIG. 7 the user interface 102 is enabled by pressing either the up or down button at 702 and 704. The first decision made by the logic controller 104 in the logic path 700 is whether the passcode function has been enabled at 706. If a passcode is required the correct passcode will have to be entered at 708 for the boat lift motor controller 101 to be ready for input at 712. If the passcode is not required, the boat lift motor controller 101 to be ready for input at 712 once the user interface is enabled at 702 or 704. If the passcode is required and the proper passcode is not entered, then the user interface 102 will not permit further control by the user at 726. It should be understood that the passcode may be used to only lock out certain functions of the boat lift motor control 101 but not all of the functions.

In the embodiment illustrated in FIG. 7, the possible inputs are to raise the boat lift cradle 130 at 714, lower the boat lift cradle 130 at 716, and stop the boat lift cradle 130 at 722, 724, 726, 728, 730, and 732. If the up button on the user interface 102 is selected, or if up is otherwise selected, the logic controller runs a diagnostic.

When up 714 is selected, the logic controller 104 determines if the boat lift cradle 130 has moved to or beyond the preset upper height limit at 718. If the boat lift cradle 130 has moved to or beyond the preset upper height limit, a signal will be sent to the at least one motor controller 106 being controlled to stop the motor 112 or motors 112 being controlled at 722. In addition, in an embodiment, a message that the upper height limit has been reached may be displayed on the user interface display 170. If the boat lift cradle has not moved beyond the upper height limit, then the diagnostic may continue through its checks and signal the at least one motor controller 106 to start the motor 112 or motors 112 at a preset raising speed 228 if all diagnostics indicate motor operation is appropriate.

In the diagnostic, at 734, the logic controller 104 checks whether the voltage being supplied to the at least one motor 112 is within acceptable operating parameters that are stored in the logic controller's memory 204. If the diagnostic test determines that the voltage being supplied to the at least one motor 112 is not within the acceptable operating parameters, an error message is sent to be displayed on the user device display 170 and a signal is sent to the motor controller 106 or controllers 106 to stop the motor 112 or motors 112 at 726. At 736, the logic controller 104 checks whether the current supplied to at least one motor 112 is within acceptable operating parameters that are stored in the logic controller's memory 204. If the diagnostic test determines that the current being supplied to the at least one motor 112 is not within the acceptable operating parameters, an error message is sent to be displayed on the user device display 170 and a signal is sent to the motor controller 106 to stop the motor 112 at 726.

When down 716 is selected, the logic controller 104 determines if the boat lift cradle 130 has moved to or beyond the preset lower height limit at 720. If the boat lift cradle 130 has moved to or beyond the preset lower height limit, a signal will be sent to the at least one motor controller 106 being controlled to stop the motor 112 at 724. In addition, in an embodiment, a message that the upper height limit has been reached may be displayed on the user interface display 170. If the boat lift cradle has not moved beyond the lower height limit, then the diagnostic may continue through its checks and signal the at least one motor controller 106 to start the motor at a preset raising speed 228 if all diagnostics indicate motor operation is appropriate.

In the diagnostic, at 738, the logic controller 104 checks whether the voltage being supplied to at least one motor 112 is within acceptable operating parameters that are stored in the logic controller's memory 204. If the diagnostic test determines that the voltage being supplied to the at least one motor 112 is not within the acceptable operating parameters, an error message is sent to be displayed on the user device display 170 and a signal is sent to the motor controller 106 to stop the motor 112 at 730. At 740, the logic controller 104 checks whether the current supplied to at least one motor 112 is within acceptable operating parameters that are stored in the logic controller's memory 204. If the diagnostic test determines that the current being supplied to the at least one motor 112 is not within the acceptable operating parameters, an error message is sent to be displayed on the user device display 170 and a signal is sent to the motor controller 106 to stop the motor 112 at 732.

The user may program desired height limits or use the default preset height limits in certain embodiments. In one embodiment, as the boat lift cradle 103 moves up and down, the lift cradle 103 height may be determined by way of the sensor or sensors 155 and the logic controller 104. In one embodiment, the user may use the program button 184 to set the upper height limit and may also use the program button 184 to set the lower height limit. In this embodiment, in the user enters program mode, moves the boat lift cradle 130 to a desired height, and sets that height as a limit. In doing so, once the boat lift cradle 130 has reached the height desired by the user, the user can stop the motor 112 and press the enter button 186 to record the height limit as the new preset height limit within the logic controller 104. The preset height limit may be saved in either the logic controller's 102 memory 204 or the storage device 206. This new height limit value then may replace the default value and remain the saved limit value until the user enters a new value through the programming function.

Alternatively, the user interface 102 may prompt the user to input a digital value that corresponds to one or both of the lift height limits. The user may input a digital value using the up button 176 and the down button 178 to select the value of a particular digit and the left arrow button 180 to move to another digit. Once the desired height limit digital value appears on the display 170 of the user interface 102 the user may set that value as one of the limits, for example, by pressing the enter button to save the value as the new preset height limit. The preset height limit may be saved in either the logic controller's 102 memory 204 or the storage device 206. This new height limit value may then replace the default value and remain the saved limit value until the user enters a new value through the programming function.

Another feature of an embodiment of the boat lift controller is the ability to program the preset speed operational parameters. The preset speed operational parameters may include a cradle raising speed, a cradle lowering speed, a cradle raising alternating current frequency, a cradle lowering alternating current frequency, a cradle raising acceleration time over which the cradle lift 130 will accelerate to the cradle raising speed, a cradle lowering acceleration time over which the cradle lift 130 will accelerate to the cradle lowering speed, a cradle raising deceleration time over which the cradle lift 130 will decelerate to a stop when rising, and a cradle lowering deceleration time over which the cradle lift 130 will decelerate to a stop when lowering. For example, the default preset parameter for cradle raising speed may be ten feet per minute, the default preset parameter for cradle lowering speed may be eight feet per minute, the default preset parameter for the cradle raising frequency may be 60 Hz, the default preset parameter for the cradle lowering frequency may be 50 Hz, the default preset parameter for the cradle raising acceleration time may be 5 seconds, the default preset parameter for the cradle lowering acceleration time may be 6 seconds, the default preset parameter for the cradle raising deceleration time is 5 seconds, and the default preset parameter for the cradle lowering deceleration time is 6 seconds. The cradle raising frequency and cradle lowering frequency may be used as the operational running speeds of the motors 112. The acceleration times and deceleration times may determine how quickly the motor 112 begins to run or stops running.

In one embodiment, the user may enter the program mode to program the preset speed operational parameters and other programmable parameters by pressing the program button 184 shown in FIG. 5 or otherwise selecting the program mode. The user interface 102 may then prompt the user through the display 170 to input the desired preset operational parameter. In this way, the user can alter the operation of the boat lift to meet the needs of the boat being lifted, or other needs of the particular type of application with which the boat lift motor controller 101 is being used. The user may input a digital value for the operational parameter by, for example, using the up button 176, the down button 178, and the left arrow button 180. Once the desired digital value appears on the display 170 of the user interface 102 the user may use the enter button to save the value as the new preset operational parameter. The preset operational parameter may be saved in either the logic controller's 102 memory 204 or the storage device 206. This new operational parameter value then replaces the default value and will remain the saved value until the user enters a new value through the programming function.

It should be understood that other operational parameters of the logic controller 104 may also be programmable and changed by the user from their default values. Other operational parameters may include GFCI operation, display mode, passcode protection, frequency limits, and stopping mode.

A preset speed operational parameters can also be used to provide a near constant lifting speed over a range of different loads. The preset speed operational parameters may control the speed at which the cable winding device 114, the motor 112, and ultimately the boat lift cradle 130 operate. In one embodiment, proximity sensors 155 and photoelectric sensors 155 among other types of sensors 155 can be used with the cable winding device 114 or the motor 112 to send a signal to the logic controller 104 for each rotation of the winding device 114. Sensors 155 may also or alternately be used in conjunction with other components of the boat lift 100 such as the cable 118 to detect the position of the boat lift cradle 130 without having to count rotations of the winding device 114. The logic controller 104 may convert the signals from one or more sensors 155 into one or more values and use those values to determine the speed of the cable winding device 114, the motor 112, or the boat lift cradle 130.

When the motor 112 is running, the logic controller 104 can detect the speed of the motor by determining how far the cable winding device 114 or the boat lift cradle 130 have moved as a function of time from the signals sent from the sensors 155. If the speed of the cable winding device 114 or the boat lift cradle 130 are not within the operational range of the preset speed operational parameters, the logic controller 104 may signal to the motor controller 106 to adjust the speed until the logic controller 104 detects that the speed is within the operational parameters' range. This operation may be performed by the logic controller's 104 processor 202 calculating the difference between the measured value of distance, over time, and the preset operational speed parameter and then calculating the required adjustment in the speed of the motor 112. The logic controller 104 may then output a signal from the output device coupling 208 to the motor controller 106. The signal may, for example, change the frequency of the motor controller's 106 output to the motor 112 to change the speed. The logic controller 104 may continue to signal to the motor controller 106 to adjust the speed of the motor 112 until the logic controller 104 determines from the information from the sensors 155 that the speed of the cable winding device 114 and the boat lift cradle 130 are within the operational speed range parameter. This may allow for boats of differing weights to be lifted and lowered at a constant speed, within the operational limits of the motor or motors 112 being used with the boat lift motor controller 101.

In embodiments employing two or more motors on a boat lift cradle 130, an embodiment of this invention permits automatic leveling of the boat lift cradle 130. For example, two or more sensors 155 may be used to detect the height of different portions, such as ends, of the boat lift cradle 130 and provide the sensed values relating to the height of the boat lift cradle 130 to the logic controller 104. The logic controller 104 may then control the speed of the motors 112 through the motor controller or controllers 106 to level the boat lift cradle 130. In a boat lift system 100 with multiple motors 112, for example, one motor 112 may lift one side of the boat lift cradle 130 faster than the a second motor 112 lifting a different side of the boat lift cradle 130. If the difference in the rate of raising or lowering between the motors 112 is too great the boat lift cradle 130 will become out of level such that boat lift cradle's 130 level should be corrected before raising or lowering can safely continue.

Returning to FIG. 1, the boat lift 100 illustrated has two motors 112 to operate the boat lift cradle 130, with a first motor 112 operating the end of the boat lift cradle depicted on the left and a second motor 112 operating the other end of the boat lift cradle depicted on the right. In this embodiment, attached to each cable winding device 130 and pipe drive shaft 151 is a sensor 155. A detail of a first embodiment of the sensor 155 mounting is illustrated in FIG. 2 and an alternate embodiment of the sensor 155 mounting is illustrated in FIG. 3. The sensor 155 of those embodiments detects the rotations of the pipe drive shaft 151 of the cable winding device 114 and sends the signal corresponding to that rotation to the logic controller 104. The sensors 155 may provide binary or analog signals to the logic controller 104. Where the sensors 155 provide binary signals to the logic controller, a first binary signal corresponding to an upward rotation of an end of the boat lift cradle 130 and a second binary signal corresponding to a downward rotation of that end of the boat lift cradle 130, the logic controller 104 will keep a count of upward rotations and a count of downward rotations signaled by each sensor 155 and calculate the height of each end of the boat lift cradle 130 based on the number of rotations signaled. Within the logic controller 104 is a compare function that enables the processor to calculate 202 the comparative heights of the ends of the boat lift cradle 130. The compare function will compare the height, as determined by the rotation count for each motor 112, to the other motors 112. When the difference between at least two of the heights becomes greater than a preset operational parameter, the logic controller 104 will alter operation of at least one of the motors 112 to level the boat lift cradle 130.

It is understood that the sensors 155 may be placed elsewhere on the boat lift 100 so that they may be able to detect the position of the boat lift cradle 130 and provide information to the logic controller 104 indicating that the boat lift cradle 130 is not level. For example, the sensors 115 could be placed to detect the position of the cable 118 and the logic controller 104 could determine if the boat lift cradle 130 is level on that basis.

There are several embodiments for how the logic controller 104 can level the boat lift cradle 130. For example, in a two motor 112 boat lift system 100, the logic controller 104 can signal to the motor controllers 106 to stop the leading motor 112 while the lagging motor 112 catches up. After the logic controller 104 has begun to signal to the motor controller 106 to stop the leading motor 112 and continue to run the lagging motor 112 the logic controller 104 will continue to compare the rotation values from the signals being sent from the sensor 115. Once the compare function indicates that the difference in the rotation values between the motors 112 is within the preset operational parameters then the logic controller 104 will end the leveling function. The logic controller 104 will signal to the motor controller 106 to resume normal operation and provide equal electrical power to each motor 114 and return to the preset running speed when the heights of the portions of the boat lift cradle have returned to within a desirable level.

In an alternate embodiment, in a two motor system, the leveling function is performed by having the logic controller 104 signal to the motor controller 106 to increase the speed of the lagging motor 112 while keeping the speed of the leading motor 112 constant. Alternatively, the logic controller 104 may signal to the motor controller 106 to increase the speed of the lagging motor 112 and signal to the other motor controller 106 to decrease the speed of the leading motor 112. A further additional way of adjusting the motor 112 speeds would be for the logic controller 106 to signal to have the speed of the leading motor 112 decreased while maintaining the speed of the lagging motor 112.

As the speeds of the motors 112 are adjusted, the logic controller 104 will continue to monitor the height of the various portions of the boat lift cradle 130 until the difference between the values is within the preset operational parameters. Once the difference between the values is within the operational parameters the logic controller 104 will end the leveling function and signal to the motor controllers 106 to return the leading motor 112 and lagging motor 112 to the preset speed.

In one embodiment, hysteresis is used to trigger the leveling function when the heights of at least two portions of the boat lift cradle 130 differ by at least a preset amount, and to trigger the termination of the leveling function when the heights of the portions of the boat lift cradle 130 differ by less than a second preset amount that is less than the preset amount that triggered the leveling function.

As will be understood, the ability for the logic controller 104 to signal for any motor 112 to increase its speed, decrease its speed, stop, or possibly reverse allows for multiple alternate permutations of how to run the leveling function. The different combinations may be employed to best suit various factors including the particular motors 112 that are being used and the size of the load the boat lift is being designed to carry. In addition, alternative embodiment may use more than two motors 112, thereby increasing the number to possibilities for combinations of speed and direction change for the leading and lagging motors 112. Additionally, there may be embodiments that use a master/slave connection between multiple motors 112, thus further allowing for additional permutations of how to run the leveling function, including having one motor controller 101 provide signals or commands to another motor controller 101. It will be understood, that the use of variable speed control within the logic controller 104 provides for a large number of combinations of how to adjust the level of the boat lift 100.

The user may also have the ability to program one or more preset leveling operational parameters. The user can use the program button 184 to cycle through the prompts until the desired leveling operational parameter is reached. The user may then select the digital value of the amount of difference in height, which may be determined in rotation counts, which will be allowed before the automatic leveling function begins. The user may input a digital value for the operational parameter using the up button 176, the down button 178, and the left arrow button 180, for example, in the user interface 102 embodiment illustrated in FIG. 5. Once the desired digital value appears on the display 170 of the user interface 102 the user may use the enter button to save the value as the new leveling operational parameter. The leveling operational parameter may be saved in either the logic controller 102 memory 204 or storage device 206, for example. This new operational parameter value may then replace the default value and remain the saved value until the user enters a new value through the programming function or resets all parameters to the factory default.

While specific embodiments of the invention have been described in detail, it should be appreciated by those skilled in the art that various modifications and alternations could be developed in light of the overall teachings of the disclosure. Accordingly, the particular arrangements, apparatuses, systems, and methods disclosed are meant to be illustrative only and not limiting as to the scope of the invention.

What is claimed is:

1. A boat lift motor controller, comprising,
a user interface for connection to a variable speed boat lift drive, the user interface to cause the variable speed boat lift drive to rise at a first speed set by a user through the user interface and lower at a second speed set by a user through the user interface and
the user interface further to cause the variable speed boat lift drive, when rising, to rise to the first speed at a first variable acceleration time programmably set by the user through the user interface and to decelerate to a stop at a first variable deceleration time programmably set by the user through the user interface, and
the user interface further to cause the variable speed boat lift drive, when lowering, to lower to the second speed at a second variable acceleration time programmably set by the user through the user interface and to decelerate to a stop at a second variable deceleration time programmably set by the user through the user interface.

2. The boat lift motor controller of claim 1, wherein the first speed and the second speed are different speeds.

3. The boat lift motor controller of claim 1, wherein the user interface is for controlling a first variable speed motor attached to a first portion of the boat lift and a second variable speed motor attached to a second portion of the boat lift, the first motor and the second motor commanded by the user interface to rise at the first speed and the first motor and the second motor commanded by the user interface to lower at the second speed.

4. The boat lift motor controller of claim 3, further comprising a level sensor sensing a level of the boat lift and transmitting a signal to the user interface, the user interface adjusting the speed of at least one of the first motor and the second motor to maintain the boat lift within a predetermined degree of level.

5. The boat lift motor controller of claim 1, wherein the user interface further comprises:
a user control; and
a processor wherein the processor executes instructions that cause the processor to:
receive the first speed from the user control;
receive the second speed from the user control;
receive a direction the boat lift is to move command from the user control;
transmit a signal indicative of the direction the boat lift is to move; and
transmit a signal indicative of the speed at which the boat lift is to move.

6. The boat lift motor controller of claim 5, wherein the user control is remote from the processor.

7. The boat lift motor controller of claim 5, wherein the processor executes further instructions that cause the processor to:
transmit a first signal to a first variable speed motor to control the speed of the first variable speed motor; and
transmit a second signal to a second variable speed motor to control the speed of the second variable speed motor.

8. The boat lift motor controller of claim 7, wherein:
the first signal is transmitted to a first motor controller to control the speed of the first motor; and
the second signal is transmitted to a second motor controller to control the speed of the second motor.

9. The boat lift motor controller of claim 1, wherein the user interface transmits a speed signal to a first motor controller to control the speed of a first motor.

10. The boat lift motor controller of claim 9, wherein the variable speed boat lift drive is for controlling one of a three phase alternating current motor, a direct current motor, and a variable frequency drive.

* * * * *